United States Patent [19]
Kleiber et al.

[11] Patent Number: 5,248,983
[45] Date of Patent: Sep. 28, 1993

[54] TRANSMITTING STATION FOR A POSITION LOCATING SYSTEM, PARTICULARLY FOR THE MICROWAVE LANDING SYSTEM, AND METHODS FOR MONITORING AND CONTROLLING SUCH A TRANSMITTING STATION

[75] Inventors: Herbert Kleiber, Ludwigsburg; Thomas Benecke, Stuttgart; Friedrich Limbach, Marbach, all of Fed. Rep. of Germany

[73] Assignee: Standard Elektrik Lorenz Aktiengesellschaft, Stuttgart, Fed. Rep. of Germany

[21] Appl. No.: 914,195

[22] Filed: Jul. 13, 1992

[30] Foreign Application Priority Data

Jul. 20, 1991 [EP] European Pat. Off. ... EP91112160.6

[51] Int. Cl.[5] .................. G01S 1/16; G01S 13/00; G01S 7/40
[52] U.S. Cl. .................. 342/408; 342/35; 342/173
[58] Field of Search ............ 342/408, 410, 412, 413, 342/35, 173; 455/115, 67.1, 67.3, 67.4, 67.5

[56] References Cited

U.S. PATENT DOCUMENTS

| | | | |
|---|---|---|---|
| 4,757,316 | 7/1988 | Brault et al. | 342/173 |
| 4,940,984 | 7/1990 | Kleiber | 342/173 |
| 5,132,692 | 7/1992 | LaBerge | 342/173 |

FOREIGN PATENT DOCUMENTS

| | | |
|---|---|---|
| 0200598 | 11/1986 | European Pat. Off. . |
| 0293099 | 11/1988 | European Pat. Off. . |
| 0335303 | 10/1989 | European Pat. Off. . |

OTHER PUBLICATIONS

Seymour et al; "Design Considerations for Achieving MLS Category III Requirements", *Proc. IEEE*, vol. 77, #11, Nov. 89; pp. 1752-1761.

B. Letoquart, "The MLS in France", *Microwave Journal*, vol. 24, #5, May 1981, pp. 113-120.

*Primary Examiner*—Gregory C. Issing
*Attorney, Agent, or Firm*—Robbins, Berliner & Carson

[57] ABSTRACT

In contrast with conventional transmitting stations for a position locating system in which the main equipment and the standby equipment operate alternately and are monitored by checking the transmitted signal received from external sensors, the present invention monitors at least the standby equipment during inactive periods during which no signal is being transmitted. In a preferred embodiment, external sensors (FS, MF) are provided for monitoring both the main transmitter (TXM) and the main timing and control section TCS1) during transmission periods, a dummy load (DL) and an internal sensor (IS) is used for monitoring the standby transmitter (TXR) during non-transmission periods, internal monitoring information (MI) is used for monitoring the reserve timing and control section (TCS2) and the electronic antenna (EA), and the two monitor sections (MS1, MS2) contained in the monitor unit are used to monitor each other.

17 Claims, 1 Drawing Sheet

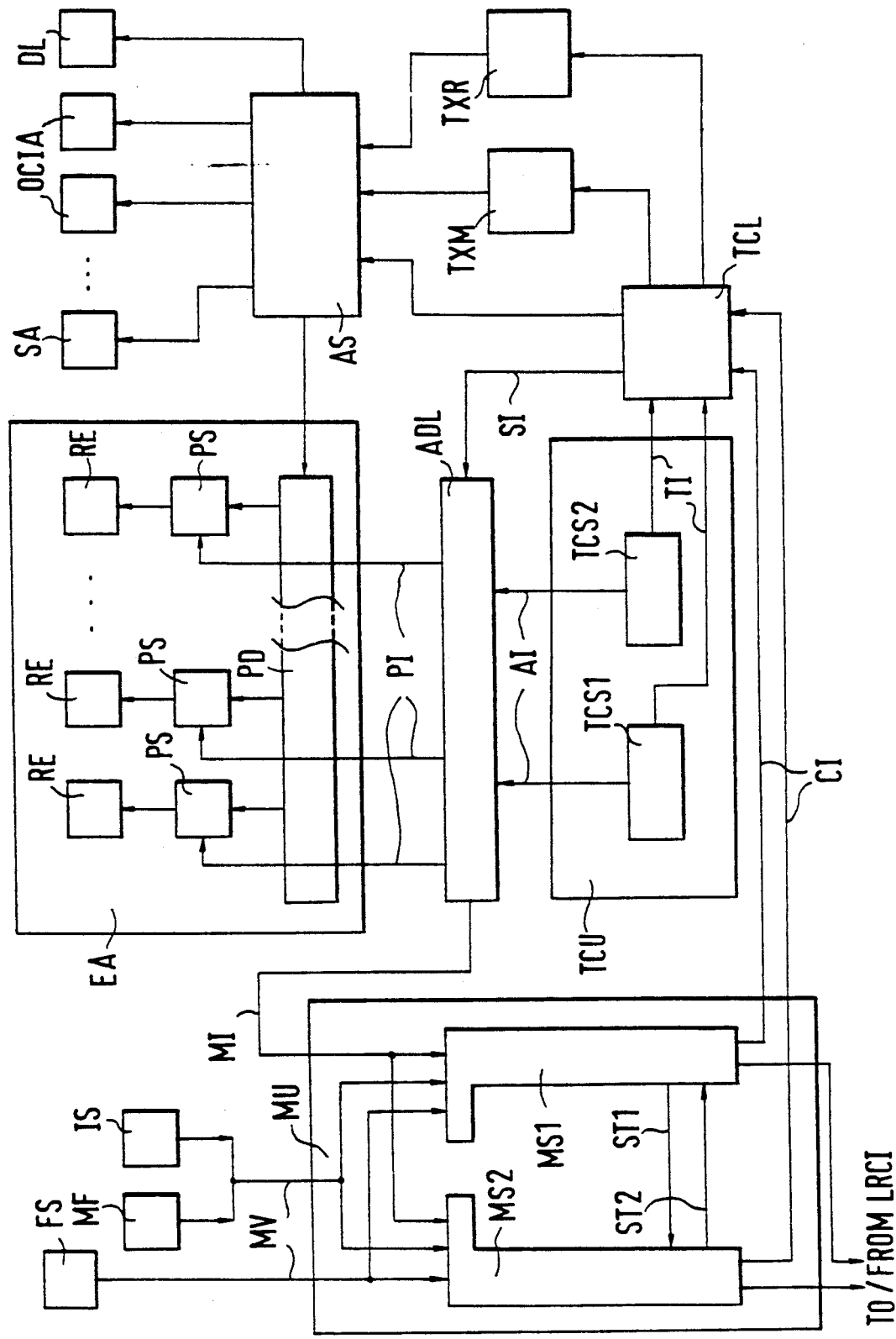

TRANSMITTING STATION FOR A POSITION LOCATING SYSTEM, PARTICULARLY FOR THE MICROWAVE LANDING SYSTEM, AND METHODS FOR MONITORING AND CONTROLLING SUCH A TRANSMITTING STATION

TECHNICAL FIELD

The present invention relates to a transmitting station for a position locating system, particularly for the microwave landing system, and to methods for monitoring and controlling such a transmitting station.

BACKGROUND ART

Especially for landing systems, availability and continuity of service (C.O.S.) are very important safety features. Therefore, the requirements for C.O.S. of the ground equipment are internationally standardized. The most stringent requirements are imposed on those systems which are intended to be used under zero-visibility weather conditions. One known method to comply with these requirements is the use of redundant equipment, e.g. dualized equipment. If the equipment currently in operation fails, the other equipment takes over and thus continues service.

Landing systems normally consist of three components: one component to derive the horizontal or azimuth angle, one component to derive the vertical or elevation angle, and one component to derive range or distance information. These three components provide the three coordinates necessary to determine the position of an aircraft. The international standards and recommended practices for ILS (Instrument Landing System) were published long ago and those for MLS (Mircowave Landing System) recently.

For a brief overview of MLS, reference is made to the MICROWAVE JOURNAL, Vol. 24, No. 5, May 1981, pages 113 to 120.

A method of monitoring a landing system ground station and providing uninterrupted operation by switching to the redundant equipment is dealt with in the European patent EP-A-0 200 598. A widely used structure is described, comprising two transmitters which are permanently monitored by two monitor units. When, for example, the transmitter in operation produces a signal which is out of tolerance, its monitor unit, through a control logic device, causes the redundant transmitter to be switched from a dummy load to the antenna. Such a structure is perfectly symmetrical, and can be used for MLS as well as for ILS. However, this conventional monitoring concept has the disadvantage of not being able to check the overall operation of the redundant transmitter, because only the signal of the operational transmitter can be monitored. With ILS, having a passive antenna, this drawback is of minor relevance. But for MLS and its electronic antenna, this concept may be unsatisfactory.

The solution disclosed in the above European patent application provides a method of monitoring a station of a landing aid system of the MLS type, said station transmitting MLS information grouped together in identical cycles, or transmission periods and comprising: an electronic antenna, two MLS information transmission equipments, switching means providing connection of said transmission equipment to said antenna, means for monitoring the operation of the station, including means for picking up the signal transmitted by said antenna; said method comprising: switching the two transmission equipments alternately to said antenna to thereby cause the transmission of MLS information signals alternately from each of the two transmission equipments to the antenna, testing signals with said monitoring means, said testing signals being supplied by said pick-up means, and switching said transmission equipment when an error is detected.

DISCLOSURE OF INVENTION

It is object of the present invention to provide a transmitting station for a position locating system, particularly for the microwave landing system, and methods for monitoring and controlling such a station which overcome the drawbacks of the prior art solutions.

This object is achieved through the use of external sensors for monitoring both the main transmitter and the main timing and control section during transmission periods, the use of a dummy load and an internal sensor for monitoring the standby transmitter during non-transmission periods, use of internal monitoring information for monitoring the standby timing and control section and the electronic antenna, and mutual monitoring of the two monitor sections contained in the monitor unit.

BRIEF DESCRIPTION OF DRAWINGS

An embodiment of the invention will now be explained in detail with reference to the accompanying drawing, showing the structure of the transmitting station according to the present invention.

BEST MODE FOR CARRYING OUT THE INVENTION

Two transmitters, a main transmitter TXM and a standby transmitter TXR, provide the radio-frequency signal to be transmitted. Both transmitters are connected to the inputs of an antenna switch AS. The antenna switch AS may have many outputs, but at least two: one for a dummy load DL and the other for an electronic antenna EA. The other outputs could be used for connection with other kinds of antennas, such as Out-of-Coverage-Indication Antennas OCIA and Sectorial Antenna SA. The dummy load DL is a device that, when connected to a transmitter, behaves like an antenna with a specified impedance. The electronic antenna EA is a well-known device that behaves like a mechanically moving antenna continuously sweeping to and fro. Normally it is composed of a number of radiating elements RE each connected to the output of an electronic phase shifter PS receiving radio-frequency power from a common power divider PD, which is connected to the antenna switch AS.

The electronic phase shifters PS are the heart of the electronic antenna EA and make it possible to obtain the scanning movement as they impose different phase shifts on the waves transmitted through the radiating elements RE. Each of the phase shifters PS receives phase information PI from an antenna drive logic ADL. This phase information PI is derived in the antenna drive logic ADL by evaluating angular information AI coming from a timing and control unit TCU.

The monitor equipment is composed of a monitor unit MU, an internal sensor IS coupled to the dummy load DL, and external sensors, such as field sensors FS and manifolds MF.

The operation of the whole station is controlled by a transfer control logic TCL that receives timing information TI from the timing and control unit TCU and control information CI from the monitor unit MU. The transfer control unit TCL delivers selection information SI to the antenna drive logic ADL and controls the operation of the antenna switch AS.

The monitor unit MU receives measured values MV from the external sensors FS and MF and from the internal sensor IS, and monitoring information MI directly from the antenna drive logic ADL.

For redundancy purposes, the timing and control unit TCU is composed of two identical timing and control sections TCS1 and TCS2 which work in parallel and both deliver angular information AI to the antenna drive logic ADL and timing information TI to the transfer control logic TCL.

Also for redundancy purposes, the monitor unit MU is composed of two identical monitor sections MS1 and MS2 which work in parallel, deliver control information CI to the transfer control logic TCL, and exchanging status information ST1 and ST2.

If the requirements are not so strict, this duplication is unnecessary.

The normal operation of such position locating systems is divided into consecutive transmission periods separated by non-transmission periods. These periods may be of different length. A measurement cycle is composed of a combination of a number of different transmission and non-transmission periods according to the standard used. During the measurement cycle, the position of the object is determined, and measurement cycles are regularly repeated to follow the movement of the object. Sometimes, the object itself takes a part in the measurement process by transmitting replies to the interrogations transmitted by the position locating station.

During transmission periods, the main transmitter TXM is active and generates a radio-frequency signal that is transmitted by one of the antennas according to schedule, and during non-transmission periods the main transmitter TXM is not active.

The monitoring of the different parts of the station is disjointed and thus can be carried out in parallel or serially according to the particular actions necessary for the respective purpose.

The monitoring of the main transmitter TXM is carried out during transmission periods. The antenna switch AS connects the main transmitter TXM to one of the antennas under control of the transfer control logic TCL, particularly, in case only the electronic antenna EA is part of the station, to the electronic antenna EA; the radio-frequency signal, generated by the main transmitter TXM, reaches the antenna and is transmitted; said transmitted signal is received through external sensors, e.g. manifolds MF and field sensors FS, and measured, and the measured values MV are sent to the monitor unit MU, where they are checked to determine whether the signal has the correct energy content and shape.

The monitoring of the reserve transmitter is carried out during non-transmission periods. The antenna switch AS connects the standby transmitter TXR to the dummy load DL, under control of the transfer control logic TCL; the standby transmitter TXR is active and generates a radio-frequency signal, which is sent to the dummy load DL; coupled to the dummy load DL is an internal sensor IS which measures this signal, and the measured values MV are sent to the monitor unit MU, where they checked to determine whether the signal has the correct energy content and shape.

The activation and the deactivation of the transmitters TXM and TXR are controlled by the transfer control logic TCL. Depending on the type of transmitters used, they can be maintained active or inactive when the transmitter is not used. For the antenna switch AS, various structures can be used: a simple and economically advantageous solution is the use of a PIN-diode double-pole N-through-connection switch; this kind of switch uses electronically controlled PIN diodes, as switching means and has a number N of outputs that can be connected to the same common contact. In this way, only one of the two inputs can be used.

The monitoring of the electronic antenna EA is carried out during non-transmission periods. The antenna switch AS disconnects the electronic antenna EA from the main transmitter TXM and from the standby transmitter TXR under control of said transfer control logic TCL, so that no radio-frequency power can reach the power divider PD; the timing and control unit TCU sends the angular information AI to the antenna drive logic ADL; the antenna drive logic ADL checks the correct functioning of the electronically controlled phase shifters PS. These phase shifters PS are generally implemented with microstrip lines that produce a different delay, or phase shift, by short-circuiting some branches to ground; this short-circuiting is performed through electronically controlled switches, like PIN diodes. The reaction of the phase shifters PS is a certain amount of current flowing in the PIN diodes. From this current it can be determined whether the phase shifters PS, and the whole electronic antenna EA are operating correctly, as all the other devices are passive. The result of this check is part of the monitoring information MI, and is sent to the monitor unit MU.

If the timing and control unit TCU is composed of two identical timing and control sections TCS1 and TCS2 which both deliver angular information AI, the antenna drive logic ADL has to be informed which of the two angular-information signals AI to use to generate the phase information PI. This is done by the transfer control logic TCL delivering the selection information SI to the antenna drive logic ADL.

The monitoring of the timing and control unit TCU or of one of said two sections, e.g. timing and control section one, TCS1, is carried out during those transmission periods in which the electronic antenna EA is used for transmission; the transmitted signal is received through said external sensors MF, FS, and measured, and the measured values MV are sent to the monitor unit MU, where they are checked to determine whether the signal has the correct time structure and phase.

If a timing and control section two, TCS2, is present, it can be monitored in the antenna drive logic ADL by simply comparing the two angular-information signals AI as they reach the antenna drive logic ADL, since the two sections work in parallel, preferably synchronously.

Further monitoring of the two timing and control sections TCS1 and TCS2 can be carried out in the transfer control logic TCL by comparing of the timing information TI coming from the two sections.

The results of both these comparisons are sent as part of monitoring information MI to the monitor unit MU.

All these measurements and results of checks are evaluated by the monitor unit MU. Basically, two actions can be initiated when one or more errors are detected: A standby transmitter is put into operation instead of the corresponding main one or the station is switched off.

As the monitoring of the various parts is disjoint, the monitor unit MU is always able to identify which part has failed.

This error condition may be signalled by an audible or visible alarm or even to an external local and remote communication interface LRCI; it is also stored as status information of the station in the monitor unit MU.

When an error is due to the main transmitter TXM, the monitor unit MU switches from the main transmitter TXM to the standby transmitter TXR by sending the control information CI to the transfer control logic TCL, which controls the switching of the antenna switch AS.

When an error is due to the timing and control section TCS1, the monitor unit MU switches from the timing and control section TCS1 to timing and control section TCS2 by sending the control information CI to the transfer control logic TCL, which delivers the appropriate selection information SI to the antenna drive logic ADL.

Taking into account the status information stored, the monitor unit MU can decide to turn off the station when said switching actions are not leading to correct operation of the station: for example, if the standby transmitter TXR has already failed, an error due to the main transmitter TXM cannot be dealt with by switching to the standby transmitter TXR.

In the event of a failure of the electronic antenna EA, the number of failures already detected and stored must be taken into account. The number of radiating elements RE and consequently of phase shifters can be in the range between twenty and one hundred. If some of them fail the operation of the system is not prejudiced. The monitor unit MU can be programmed to accept a given number of errors coming from the electronic antenna EA and to turn off the station if more errors occur.

This off-condition may, of course, be signalled either to the operators or to the local and remote communication interface LRCI.

For testing and maintenance purposes, it could be useful to be able to switch the monitor unit MU to a particular mode in which no turn-off action takes place. This could be done either directly by the operator or through the local and remote communication interface LRCI.

As we have already described, to improve reliability, the monitor unit MU may be composed of two identical monitor sections MS1 and MS2 which work in parallel and receive the measured values MV from the sensors and the monitoring information MI from the antenna drive logic ADL.

Both sections evaluate the same data and update their status information, including internal status information relating to their operation. Normally one of them detects an error a little bit earlier than the other. This first section, for example MS1, then monitors the other section MS2 by reading its status ST2, and checks whether the other section MS2 behaves like the first section MS1 is supposed to. In that case, only monitor section MS2 delivers the control information CI to the transfer control logic TCL.

In case of differences, an error is signalled by the monitor unit MU.

We claim:

1. Transmitting station for a position locating system, comprising:
    a main transmitter,
    a standby transmitter,
    a dummy load,
    an electronic scanning beam antenna including electronically controlled phase shifters,
    an antenna switch connected to respective radio frequency power outputs of said main and standby transmitters and to respective inputs of said electronic antenna and said dummy load,
    an antenna drive logic connected to and delivering phase information to said phase shifters,
    at least one external sensor coupled to said antenna,
    an internal sensor coupled to said dummy load,
    a monitor unit receiving measured values from said at least one external sensor and said internal sensor as well as monitoring information from said antenna drive logic representative of the operation of said phase shifters,
    a timing and control unit delivering angular information to said antenna drive logic, and
    transfer control logic receiving timing information from said timing and control unit and control information from said monitor unit, for controlling said antenna switch, said main transmitter, and said standby transmitter,
whereby the operation of said phase shifters can be monitored by the monitor unit during non-transmission periods in which no radio-frequency power is supplied from either of said transmitters to the antenna.

2. Transmitting station according to claim 1 in which
    said timing and control unit comprises two identical timing and control sections working in parallel which both deliver said angular information to said antenna drive logic and which both deliver said timing information to said transfer control logic, and
    said transfer control logic delivers selection information to said antenna drive logic.

3. Transmitting station according to claim 1 in which said monitor unit is connected to an external local and remote communication interface.

4. Transmitting station according to claim 1 in which said monitor unit comprises two identical monitor sections working in parallel which both receive said measuring values from said at least one external sensor and said internal sensor as well as monitoring information from said antenna drive logic, which both deliver such control information to said transfer control logic, and which both exchange status information.

5. Method for monitoring a transmitting station for a position locating system having a main transmitter, a standby transmitter, an electronic scanning beam antenna having phase shifters responsive to phase information delivered by an antenna drive logic, and an antenna switch for selectively connecting the antenna to the main transmitter or the standby transmitter, said method comprising the steps
    dividing the operation of said transmitting station into an alternating sequence of periods not necessarily all of the same length, including transmission periods during which said main transmitter is active and generates a radio-frequency signal to be transmitted, and non-transmission periods during which said main transmitter is not active, monitoring said main transmitter during said transmission periods, and monitoring said standby transmitter and said electronic antenna during said non-transmission periods.

6. Method according to claim 5 wherein the monitoring of said main transmitter further comprises the steps connecting the main transmitter to said electronic antenna, using an external sensor to receive signals transmitted by the electronic antenna, and checking a signal received from the external sensor for correctness;

the monitoring of said standby transmitter further comprises the steps providing a dummy load with an internal sensor, connecting the standby transmitter to said dummy load, sending a radio-frequency signal from said standby transmitter to said dummy load, and checking measured values from said internal sensor for correctness; and the monitoring of said electronic antenna further comprises the steps disconnecting said electronic antenna from both the main transmitter and the standby transmitter, causing the antenna drive logic to send phase information to the phase shifters of the electronic antenna, and checking the response of the phase shifters for correctness.

7. Method according to claim 5, further comprising the steps providing two identical timing and control sections within said timing and control logic, using angular information coming from one said timing and control section in the transmission of a radio-frequency signal, using at least one external sensor to receive the radio-frequency signal, and checking the received radio-frequency signal for correctness, whereby the monitoring of one of the two identical timing and control sections may be carried out during one of said transmission periods.

8. Method according to claim 5, further comprising the steps providing two identical timing and control sections within said timing and control logic, checking said angular information from said two identical timing and control sections for identity, and sending the result of said check to a monitor unit.

9. Method according to claim 5, further comprising the steps providing two identical timing and control sections within said timing and control logic, checking the timing information from said two identical timing and control sections for identity, and sending the result of said check to a monitor unit.

10. Method according to claim 5, wherein if an error is detected during the monitoring of said main transmitter, the antenna is switched from said main transmitter to said standby transmitter.

11. Method according to claim 7, wherein if an error is detected during the monitoring of said one timing and control section, the angular information from the other timing and control section is selected.

12. Method according to claim 11 wherein the angular information from the other timing and control section is selected if, based on previously stored error information, it is expected to lead to correct operation.

13. Method according to claim 11 in which if more than a given number of errors have occurred, the transmitted station is turned off and an error condition is signalled.

14. Method according to 11 wherein the transmitting station is provided with a testing or maintenance mode in which the station is not turned off if an error is detected.

15. Method according to claim 13 in which said errors are transmitted to a local and remote communication interface.

16. Method according to claim 10, wherein said transmitting station is provided with two identical monitor sections and if an error is detected by one of the monitor sections, it checks whether the other monitor section is operating correctly by reading its status information, and if not, signals an error condition.

17. Transmitting station according to claim 1 in which the position locating system is a microwave landing system.

* * * * *